US008239868B2

(12) United States Patent
Misono et al.

(10) Patent No.: US 8,239,868 B2
(45) Date of Patent: Aug. 7, 2012

(54) COMPUTER SYSTEM, SERVERS CONSTITUTING THE SAME, AND JOB EXECUTION CONTROL METHOD AND PROGRAM

(75) Inventors: Kazuhisa Misono, Kanagawa-ken (JP); Kazutoshi Sugimoto, Tokyo (JP); Takashi Yonezawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1696 days.

(21) Appl. No.: 10/599,063

(22) PCT Filed: Mar. 16, 2005

(86) PCT No.: PCT/JP2005/004653
§ 371 (c)(1),
(2), (4) Date: Sep. 19, 2006

(87) PCT Pub. No.: WO2005/091137
PCT Pub. Date: Sep. 29, 2005

(65) Prior Publication Data
US 2007/0283355 A1    Dec. 6, 2007

(30) Foreign Application Priority Data

Mar. 19, 2004  (JP) ................................. 2004-080396

(51) Int. Cl.
*G06F 9/46*    (2006.01)
*G06F 15/173*    (2006.01)

(52) U.S. Cl. ......... 718/102; 718/104; 709/225; 709/226
(58) Field of Classification Search .......................... None
See application file for complete search history.

(56) References Cited

U.S. PATENT DOCUMENTS

| | | | | |
|---|---|---|---|---|
| 6,098,091 A * | 8/2000 | Kisor | ............................. | 709/202 |
| 6,202,096 B1 * | 3/2001 | Williams et al. | .............. | 709/230 |
| 6,779,016 B1 * | 8/2004 | Aziz et al. | ...................... | 709/201 |
| 7,503,045 B1 * | 3/2009 | Aziz et al. | ...................... | 718/104 |

(Continued)

FOREIGN PATENT DOCUMENTS

| | | | |
|---|---|---|---|
| JP | 6-348663 A | 12/1994 | |
| JP | 2003-6175 A | 1/2003 | |
| JP | 2003-507817 A | 2/2003 | |
| JP | 2004-46810 A | 2/2004 | |

(Continued)

OTHER PUBLICATIONS

Korpela, E et al, "SETI@Home—Massively Distributed Computing for SETI," Scientific Programming, Computing in Science & Engineering, pp. 78-83, Jan./Feb. 2001.

(Continued)

*Primary Examiner* — Camquy Truong
(74) *Attorney, Agent, or Firm* — Steven E. Bach

(57) ABSTRACT

[Object] To provide a system capable of performing optimum job scheduling in respect of the types and utilization of computers as well as the types of jobs, and readily accommodating changes to the system configuration, in a grid computing system.
[Constitution] A center server 100 which requests process servers on a grid computing network to execute jobs includes a scheduler section 110 which assigns a job to be executed to a process server and issues a job execution request, and a PS agent section 120 which manages information about the process servers 200, receives a request issued by the scheduler section 110, and sends the request to the process server 200 to which the requested job has been assigned, depending on the operating status and access type of the process server 200.

15 Claims, 6 Drawing Sheets

U.S. PATENT DOCUMENTS

2002/0019844 A1 2/2002 Kurowski
2002/0198924 A1* 12/2002 Akashi et al. ............... 709/102
2004/0230661 A1* 11/2004 Rashid et al. ............... 709/207

FOREIGN PATENT DOCUMENTS

JP 11-15799 A 1/1999
JP 2000-47890 A 2/2000

OTHER PUBLICATIONS

Smith, C., "Open Source Metascheduling for Virtual Organizations with the Community Scheduler Framework (CSF)," Technical Whitepaper, Platform Computing Inc., p. 1-15, 2003.

Korpela, E. et al. "SETI@Home-Massively Distributed Computing for SETI", Computing in Science & Engineering, pp. 78-83, Jan./Feb. 2001.

Smith, C., Open Source Metascheduling for Virtual Organizations with the Community Scheduler Framework (CSF), Platform Computing Inc., Technical Whitepaper, pp. 2-15, 2003.

Czajkowski K et al; "Grid information services for distributed resource sharing", Aug. 1, 2001, Proceedings of the International Symposium of Highperformance Distributed Computing, XX, XX, pp. 1-14, XP002308029.

* cited by examiner

COMPUTER SYSTEM, SERVERS CONSTITUTING THE SAME, AND JOB EXECUTION CONTROL METHOD AND PROGRAM

TECHNICAL FIELD

The present invention relates to grid computing and, in particular, to a scheduling method for assigning jobs to computers and a system configuration that implements the method.

BACKGROUND ART

A system called grid computing has attracted people's attention in recent years that integrates and uses heterogeneous information systems interconnected through a network. In this system, computer resources such as CPU power and data storage of multiple computers on the network are shared so that the system is used as a single, virtual high-performance computer. By causing the multiple computers to perform parallel processing, a large amount of processing can be performed at high speeds even though the performances of the individual computers are low.

In grid computing, scheduling which determines the execution sequence of jobs (units of processing in a program) provided to the system according to the characteristics and priorities of the jobs is extremely important. This is because, in a grid environment which is inherently heterogeneous, jobs must be assigned to multiple computers having different performances and execution of various jobs of different sizes provided from remote users as well as local users must be properly scheduled.

Scheduling schemes in grid computing can be broadly classified into two types: push and pull. In the push type scheduling (see Non-patent document 1 for example), when a job is submitted to a scheduler, the scheduler assigns a computer to execute the job and requests the computer to execute the job. For doing this, the scheduler monitors the status of the computers and assigns the job to the most suitable computer according to load information of the job.

The push type scheduling scheme is often used in a grid system called a cluster grid that consists of several hundred servers (computers) provided at the same site. The push type scheduling scheme can assign a job specifically to the most suitable computer and therefore can provide optimum scheduling. Especially, in an environment where there are variations in behavior of computers and a job can be canceled on a computer when a user uses the computer, this scheme can provide optimum scheduling by taking such an operating environment into consideration to enable very efficient utilization of the system.

In the pull type scheduling (see Non-patent document 2 for example) on the other hand, each computer polls a scheduler to request a job when the computer becomes ready to execute a job. If there is a job to execute when the request is made, the scheduler assigns the job to the computer and the computer executes the assigned job. If there is no job to execute, the computer polls again after a lapse of predetermined time.

The pull type scheduling scheme can be implemented with a very simple configuration and, therefore, it is often used in grid systems consisting of several thousand computers. Especially, a grid built on the Internet uses this pull scheduling scheme because of constraints of the network. Furthermore, the pull type scheduling scheme can be readily applied to a large number of computers because management information about the computers is simple. Self-optimization by polling (that is, computers with higher availability perform polling more frequently) can improve the efficiency to some extent.

Non-patent document 1: Chris Smith, "Open Source Metascheduling for Virtual Organizations with the Community Scheduler Framework (CSF)", Technical Whitepaper, Platform Computing Inc., August 2003

Non-patent document 2: Eric Korpela, Dan Werthimer, David Anderson, Jeff Cobb, Matt Lebofsky, "Massively Distributed Computing for SETI", Computing in Science & Engineering, Vol. 3, Issue 1, January-February 2001, Pages 78-83

DISCLOSURE OF THE INVENTION

Problems to be Solved by the Invention

As described above, the conventional push type scheduling scheme in grid computing enables optimum job assignment. However, in order to accomplish optimum scheduling, the utilization of each computer must be managed. Accordingly, operations of scheduler are complicated and changes to a system configuration (such as addition or removal of a compute that executes jobs) cannot readily be accommodated. Furthermore, the push type scheduling cannot be applied to computers inside a firewall because the scheduler accesses each computer to request it to execute a job.

On the other hand, the pull type scheduling scheme can readily accommodate changes to a system configuration because computer management information required by the scheduler is simple. Furthermore, jobs can be assigned to computers inside a firewall because access on the network is performed by polling from the computers. Although the pull type scheduling scheme enables self-optimization by the polling, it causes a time loss. That is, even when there is a job to execute, a request for execution of the job is issued only after polling from a computer. Moreover, when a computer performs polling, a job that is optimum to the polling computer is assigned to the computer among jobs to be executed, which may not result in the most efficient scheduling for the whole system because, depending on the type of the job, there can be more suitable computers.

Therefore an object of the present invention is to provide a system and a job execution control method capable of implementing optimum scheduling in grid computing based on the types and utilization status of computers as well as the types of jobs, and readily accommodating changes to a system configuration.

Another object of the present invention is to enable optimum job assignment equivalent to that of push type scheduling even in a grid including computers access to which is controlled through a firewall.

Yet another object of the present invention is to provide a scheduling method that is a combination of push type scheduling and pull type scheduling, and to provide a system using the method.

Means for Solving the Problems

In order to achieve the objects, the present invention provides a computer system for performing grid computing by using multiple computers interconnected through a network and is configured as follows. The computer system includes a center server which is a computer requesting computers on the network to execute a job, and process servers each of which is a computer executing a job in response to a request from the center server. The center server includes a scheduler section which assigns a job to be executed to a process server and issues a job execution request, and an agent section which manages information about the process server, receives the request issued by the scheduler section, and sends the request to the process server to which the requested job has been assigned, depending on the status of the process server.

In particular, multiple agent sections are provided in association with the multiple process servers in one-to-one correspondence.

Preferably, the agent section obtains from a corresponding process server and manages information about the capacity and operating status of the corresponding process server. The scheduler section assigns a job to the process server on the basis of the information managed by the agent section.

The agent section sends a request received from the scheduler section in response to a polling access from the process server, or sends a request received from the scheduler section at timing managed by the agent section, depending on an access type of the process server.

In particular, if a process server is connected to the center server through a firewall and cannot be accessed by the center server across the firewall, the agent section waits for a polling access from the process server before sending a request.

In another aspect of the present invention that achieves the objects described above, a job execution control method is provided to perform scheduling of jobs in a grid computing system and request execution of the jobs, using a computer. The job execution control method includes the steps of assigning a job to a process server constituting a system and executing a job, on the basis of the capacity of the process server stored in a storage regardless of the operating status of the process server, issuing a job execution request to the process server to which the job is assigned, and holding temporarily the issued job execution request and sending the job execution request to the process server to which the job is assigned, depending on the operating status of the process server.

The present invention further provides a program for controlling a computer to implement the functions of the center server described above or for causing a computer to perform operations equivalent to the steps of the job control method described above. The program may be distributed with a magnetic disk, optical disk, semiconductor memory, or other recording medium in which the program is stored, or distributed through a network.

Advantages of the Invention

According to the present invention configured as described above, an agent section that relays communication between a scheduler and a process server in grid computing is provided on a center server and the agent section performs control to accommodate a difference in access types among process servers, thereby enabling optimum scheduling in terms of the types and utilization status of computers as well as the types of jobs regardless of the difference in access types among the process servers. Furthermore, because the agent section is provided for each process server, a system configuration can be readily modified by adding or removing a process server or servers.

According to the present invention, because the agent section performs control to accommodate a difference in the access types among the process servers, a process server capable of directly receiving a job execution request through the push type scheduling may coexist with a process server receiving a job execution request after polling through the pull type scheduling, in the system, and optimum job assignment equivalent to that of the push type scheduling can be accomplished.

BEST MODE FOR CARRYING OUT THE INVENTION

The best mode for carrying out the present invention (hereinafter referred to as the embodiment) will be described in detail below with reference to the accompanying drawings.

Figure 1:
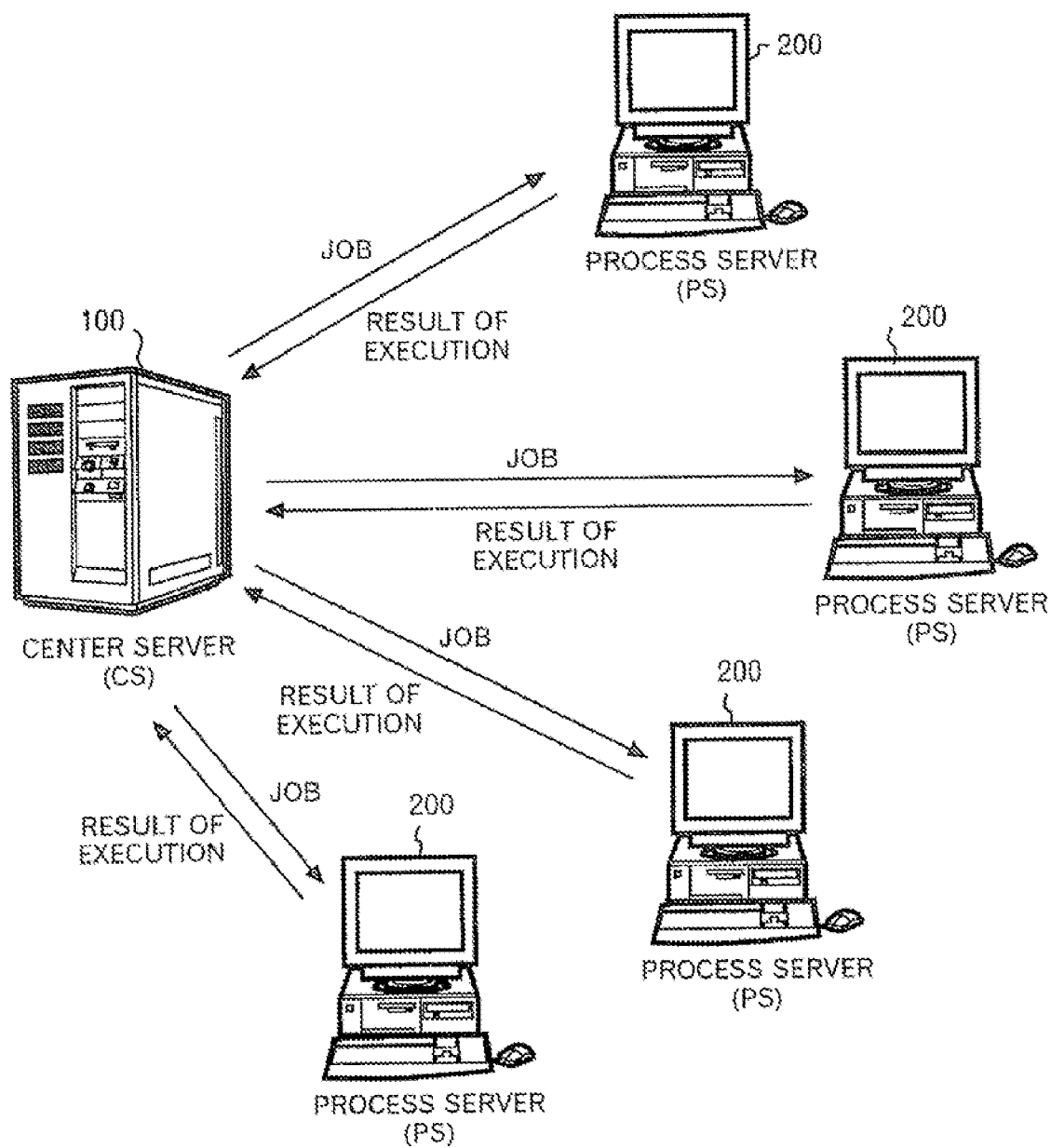
FIG. 1 shows a general configuration of a grid computing system according to an embodiment.

FIG. 1 shows a general configuration of a grid computing system according to the present embodiment.

As shown in FIG. 1, the system of the present embodiment includes a center server (CS) 100 which assigns jobs and process servers (PS) 200 which actually execute jobs assigned by the center server 100. The center server 100 and the process severs 200 are interconnected through the Internet or other computer network. The computer network may be a wired or wireless communication network using any communication protocol, and may have a firewall or any other access control.

Figure 2:
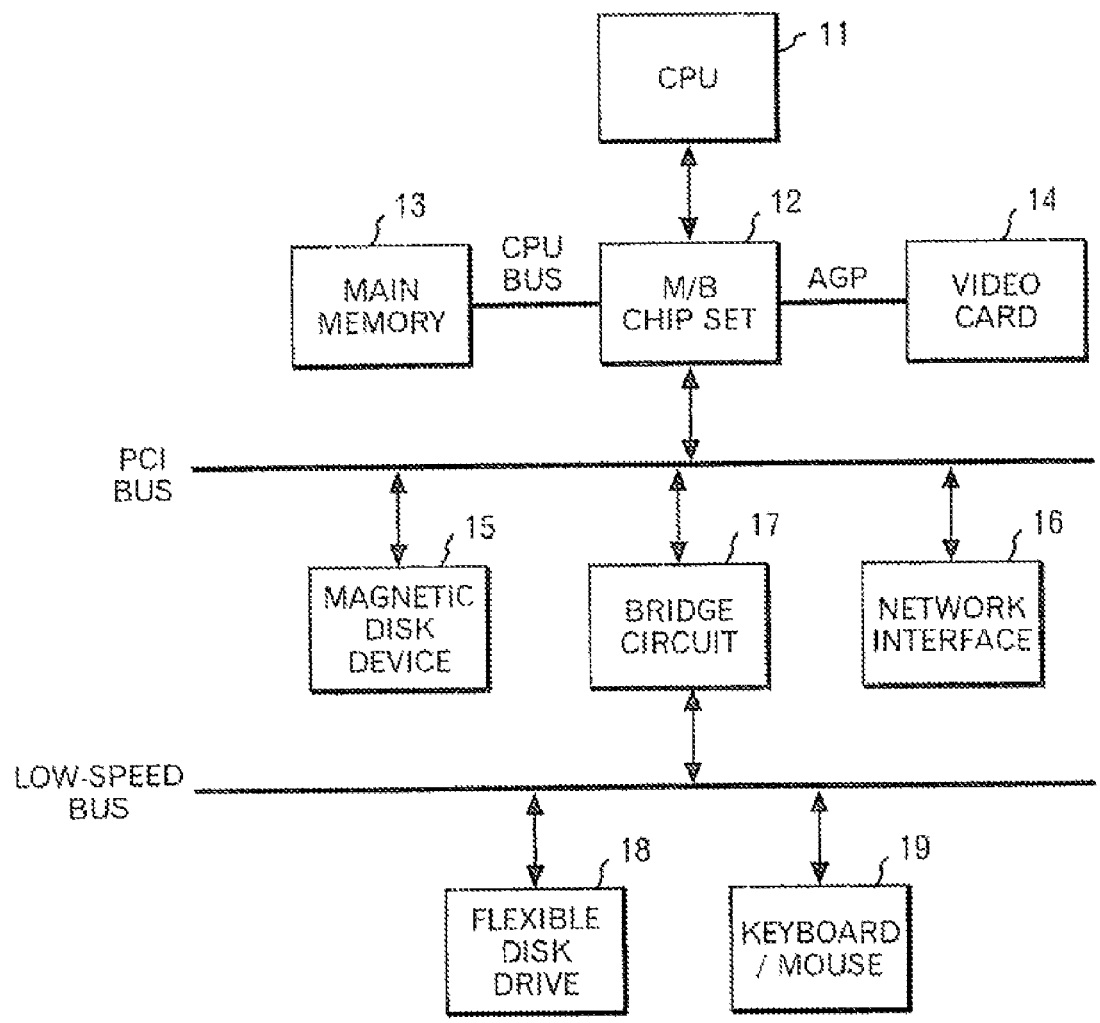
FIG. 2 schematically shows a hardware configuration of a computer suitable for implementing a center server and a process server in the grid computing system according to the embodiment.

FIG. 2 schematically shows a hardware configuration of a computer suitable for implementing the center server 100 and the process server 200 in the grid computing system according to the present embodiment.

The computer shown in FIG. 2 includes a CPU (Central Processing Unit) 11 which is processing means, a main memory 13 connected to the CPU 11 through a M/B (mother board) chip set 12 and a CPU bus, a video card 14 also connected to the CPU 11 through the M/B chip set 12 and an AGP (Accelerated Graphics Port), a magnetic disk device (HDD) 15 and a network interface 16 both connected to the M/B chip set 12 through a PCI (Peripheral Component Interconnect) bus, and a flexible disk drive 18 and keyboard/mouse 19 both connected to the M/B chip set 12 through the PCI bus, a bridge circuit 17, and a low-speed bus such as an ISA (Industry Standard Architecture) bus.

It should be noted that the hardware configuration of the computer that implements the present embodiment shown in FIG. 2 is illustrative only and any other configurations may be used as long as the present embodiment can be applied thereto. For example, instead of the video card 14, a video memory alone may be provided and image data may be processed in the CPU 11. An external storage device such as a CD-R (Compact Disc Recordable) and DVD-RAM (Digital Versatile Disc Random Access Memory) drive may be provided through an interface such as an ATA (AT Attachment) or SCSI (Small Computer System Interface).

Figure 3:
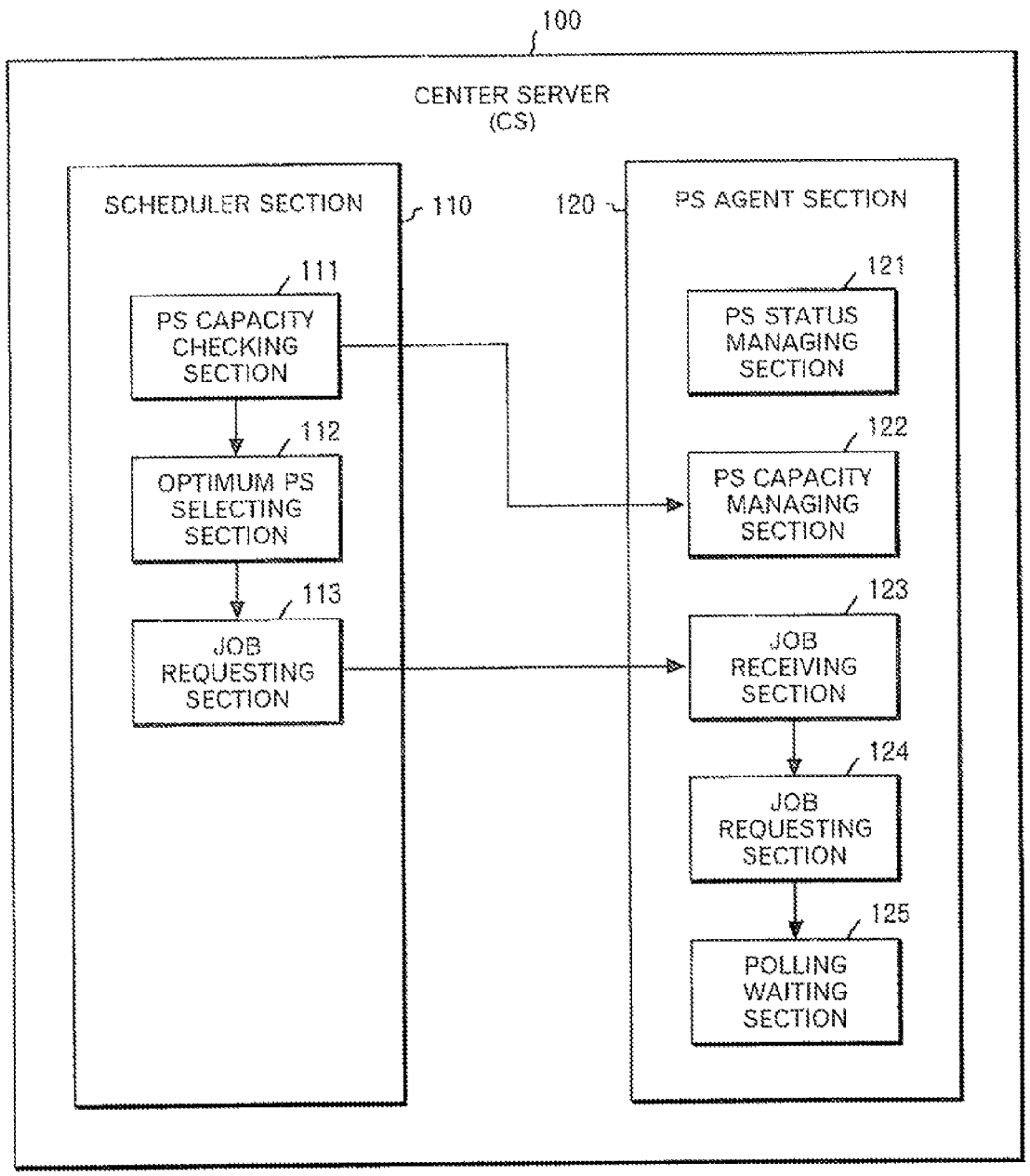
FIG. 3 shows a functional configuration of a center server according to the embodiment.

FIG. 3 shows a functional configuration of the center server 100. The center server 100 includes a scheduler section 110 which performs job assignment (scheduling) for each process server 200, and a PS agent section 120 which manages a process server 200 and relays requests and responses transmitted to and from the process server 200. The PS agent section 120 is provided for each of the process servers 200 making up the grid computing system. The scheduler section 110 accesses each process server 200 through the PS agent section 120.

The scheduler section 110 may be implemented by the program controlled CPU 11 and memory means such as the main memory 13 and the magnetic disk device 15 shown in FIG. 2, for example, and includes, as specific functional units, a PS capacity checking section 111, an optimum PS selecting section 112, and a job requesting section 113 as shown in FIG. 3.

The PS capacity checking section 111 makes an inquiry to the PS agent sections 120 corresponding to the respective process servers 200 about the capacity of the process servers 200 to obtain the information.

The optimum PS selecting section 112 selects an optimum process server 200 for a job on the basis of the capacity information of the process servers 200 obtained by the PS capacity checking section 111 and assigns the job to that process server 200. Any optimization logic may be used in the job assignment.

The job requesting section 113 issues a request for job execution to a PS agent section 120 corresponding to a process server 200 selected by the optimum PS selecting section 112.

In the present embodiment, the PS agent section 120 relays communication between the scheduler section 110 and the process server 200 and receives a job execution request from the scheduler section 110 on behalf of the process server 200. Accordingly, the PS capacity checking section 111 makes an inquiry to the PS agent 120 and the job requesting section 113 issues a request to the PS agent 120. However, the function of the scheduler section 110 is the same as that of the existing push type scheduler. Therefore, a scheduler used in the existing grid computing system can be used as the scheduler section 110.

The PS agent section 120 may be implemented by the program controlled CPU 11 and memory means such as the main memory 13 and the magnetic disk device 15 shown in FIG. 2, for example, and includes, as specific functional units, a PS status managing section 121, a PS capacity managing section 122, a job receiving section 123, a job requesting section 124, and a polling waiting section 125, as shown in FIG. 3.

The PS status managing section 121 accesses the corresponding process server 200 to ascertain the current operating status of the process server 200.

The PS capacity managing section 122 manages statistical information concerning the job execution capacity of the process server 200 and, in response to an inquiry from the PS capacity checking section 111 of the scheduler section 110, returns information managed by the PS capacity managing section 122. The statistical information concerning the job execution capacity includes static information about the throughput of a CPU and the storage capacity of a storage device as well as information obtained by statistically processing dynamic information such as changes of load on the CPU with time and the operation pattern of the CPU.

Information managed by the PS status managing section 121 and the PS capacity managing section 122 is obtained from the process server 200 corresponding to the PS agent section 120 and is stored in storage means such as the main memory 13 or the magnetic disk device 15 shown in FIG. 2.

The job receiving section 123 receives a job execution request issued by the job requesting section 113 of the scheduler section 110.

The job requesting section 124 transfers a job execution request received at the job receiving section 123 to the corresponding process server 200.

The polling waiting section 125 receives notification that the process server 200 is ready to execute a job, from the process server 200 through polling.

According to the present embodiment, while a push type scheduler is used, a polling access from a process server 200 can be accepted and a job execution request can be sent in response to the polling access, which will be detailed later. The polling waiting section 125 in the PS agent section 120 is used for receiving such polling and, therefore, is not a necessary component for the PS agent section 120 for a process server 200 capable of receiving, without polling, a job execution request sent from the center server 100 at desired timing in the center server 100.

A relationship between a functional configuration of a process server 200 and a corresponding PS agent section 120 will be described below.

As mentioned above, some of the process servers 200 assumed in the present embodiment perform polling and the others do not perform polling.

Figure 4:
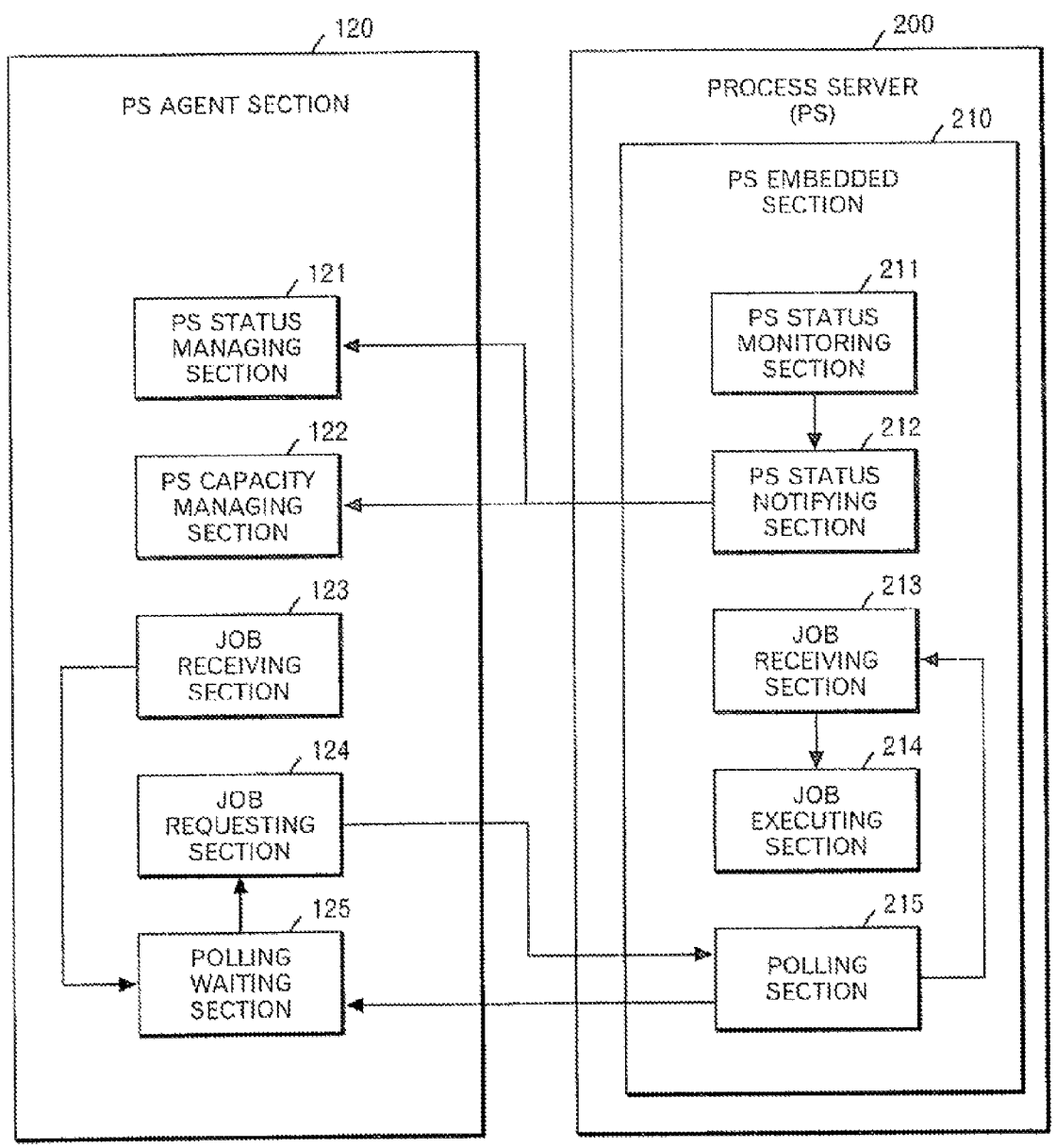
FIG. 4 shows a relationship between a functional configuration of a process server that performs polling and a PS agent section according to the embodiment.

FIG. 4 shows the relationship between a functional configuration of a process server 200 that performs polling and a corresponding PS agent section 120.

The process server 200 includes a PS embedded section 210 which allows a computer as shown in FIG. 2 to function as a process server 200 in the grid computing system.

The PS embedded section 210 may be implemented by the program controlled CPU 11 and storage means such as the main memory 13 or the magnetic disk device 15 shown in FIG. 2, for example, and includes, as specific functional units, a PS status monitoring section 211, a PS status notifying section 212, a job receiving section 213, a job executing section 214, and a polling section 215 as shown in FIG. 4.

The PS status monitoring section 211 monitors the current utilization status of the process server 200 and status of resources to collect information.

The PS status notifying section 212 provides information about the utilization status of the processing server and the status of the resources collected by the PS status monitoring section 211 to the PS agent section 120 of the center server 100. The PS status managing section 121 and the PS capacity managing section 122 in the PS agent section 120 receive the notification and store it in a storage device such as the main memory 13 or magnetic disk device 15 for management purpose. Notification from the PS status notifying section 212 to the center server 100 may be provided at regular intervals or may be provided when the operating status of the process server 200 has changed. Alternatively, the corresponding PS agent section 120 on the center server 100 may make an inquiry to the process server 200 at any timing.

The job receiving section 213 receives a job execution request sent from the job requesting section 124 of the PS agent section 120 of the center server 100.

The job executing section 214 executes a job received at the job receiving section 213 by using resources of the process server 200.

The polling section 215 notifies the PS agent section 120 on the center server 100 that the process server 200 is ready to execute a job if the polling section 215 determines so on the basis of information monitored by the PS status monitoring section 211. The polling waiting section 125 in the PS agent section 120 receives the notification from the polling section 215 and causes the job requesting section 124 to send a job execution request.

It should be noted that the polling section 215 can be omitted from a process server 200 if the server is capable of receiving a job execution request sent from the center server 100 without performing polling, that is, if the process server 200 is not placed inside a firewall or otherwise access controlled.

Figure 5:
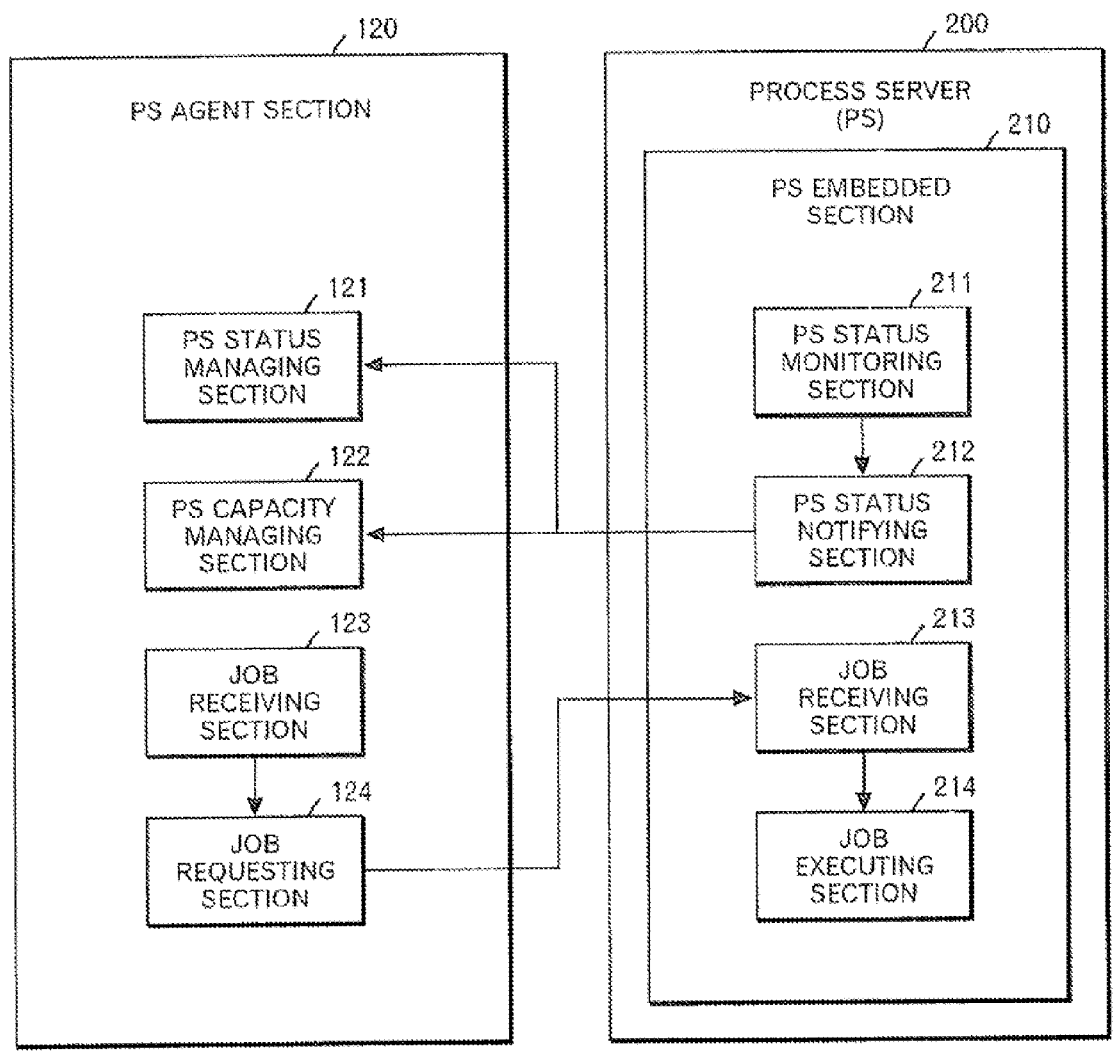
FIG. 5 shows a relationship between a functional configuration of a process server that does not perform polling and a PS agent section according to the invention.

FIG. 5 shows a relationship between a functional configuration of a process server 200 that does not perform polling and a PS agent section 120.

Operations of the grid computing system configured as described above according to the present embodiment will be described below.

As mentioned above, the scheduler section 110 of the center server 100 is the same as the existing push type scheduler. Therefore, when a job to be executed occurs, the scheduler section 110 tries to assign the job to any of the process servers 200 being managed by the center server 100. The scheduler section 110 obtains statistical information about the capacities and operation patterns of the process servers 200 from the PS agent sections 120 and performs optimum scheduling on the basis of the information and the type and characteristics of the job. The scheduler section 110 issues a job execution request regardless of the operating status of the process server 200 to which the job has been assigned, and sends it to the PS agent section 120 corresponding to the process server 200 to request it to execute the job.

The PS agent section 120 operates differently depending on whether the access type of the process server 200 is the one capable of receiving a job execution request directly from the center server 100, or the one receiving a job execution request after polling because the process server 200 is placed inside a firewall.

Figure 6:
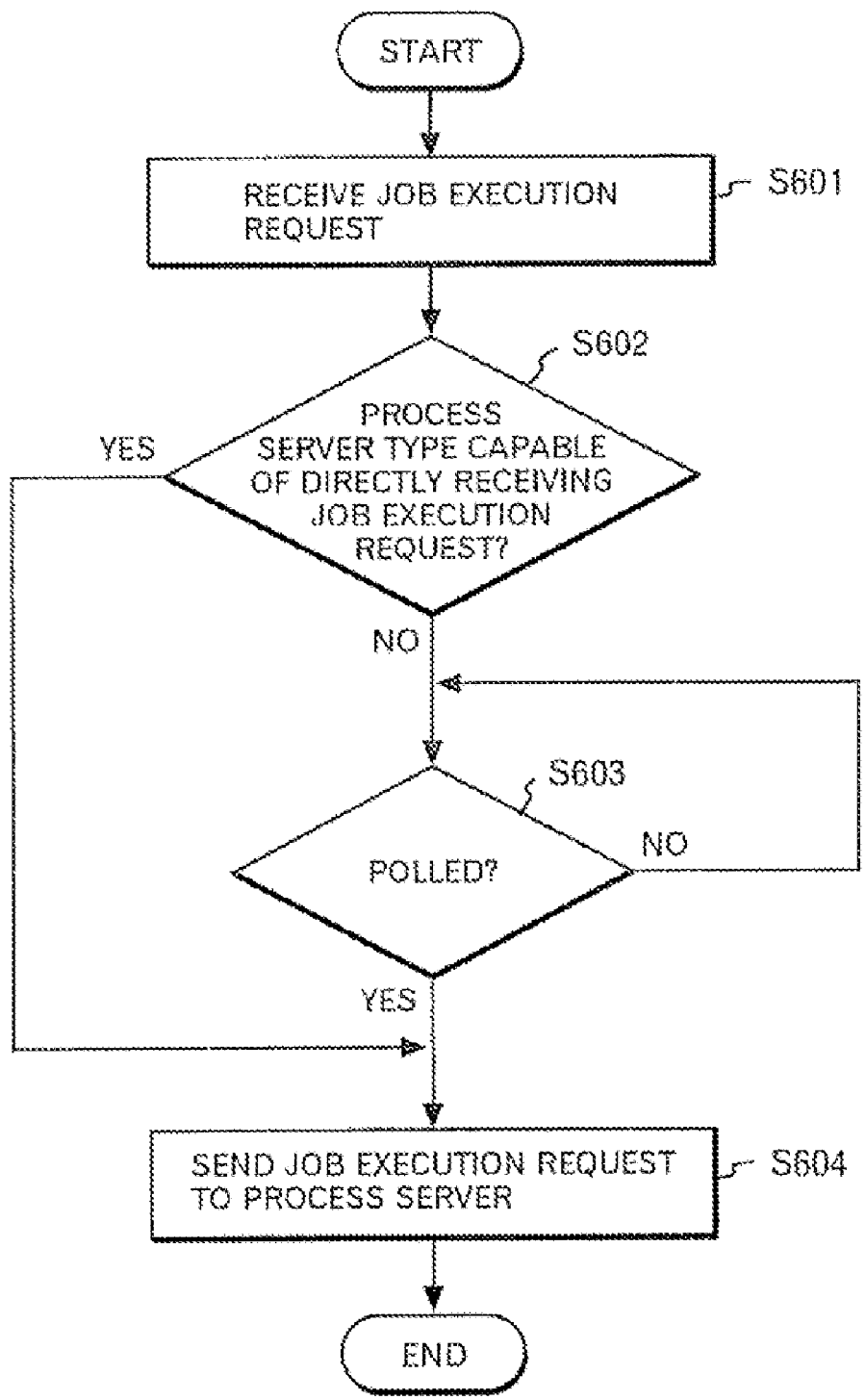
FIG. 6 is a flowchart illustrating an operation performed by a PS agent section when a job execution request is issued according to the embodiment.

FIG. 6 is a flowchart illustrating an operation of a PS agent section 120 when it receives a job execution request.

As shown in FIG. 6, the PS agent section 120 receives a job execution request from the scheduler section 110 through the job receiving section 123 (step 601). If a process server 200 corresponding to the PS agent section 120 is of the type capable of directly receiving a job execution request, the PS agent section 120 imrelayly sends the job execution request to the process server 200 (steps 602 and 604).

On the other hand, if the process server 200 corresponding to the PS agent section 120 is of the type that performs polling to receive a job execution request, the PS agent section 120 waits until the process server 200 polls (steps 602 and 603), then sends the job execution request received from the scheduler 110 to the process server 200 (step 604). If the PS agent section 120 does not have a job execution request to be sent when the process server 200 polls, the PS agent section 120 performs no action and waits until a job and next polling are received.

If the process server 200 is of the type capable of directly receiving a job execution request from the center server 100, the process server 200 receives the job execution request, executes the job according to the request, and then returns the result of the execution to the PS agent section 120 of the center server 100.

On the other hand, if the process server 200 is of the type that performs polling before receiving a job execution request, the process server 200 performs polling when it becomes ready to execute a job. Then the process server 200 waits until a job execution request is sent. When it receives a job execution request sent from a corresponding PS agent section 120 on the center server 100, the process server 200 executes the job according to the request and returns the result of the execution to the PS agent section 120 on the center server 100. If the process server 200 has not received a job execution request, it repeats polling after a lapse of predetermined time.

The operation of the process server 200 described above is the same as that of a process server in a conventional grid computing system. However, in the present embodiment, each of the PS agent sections 120 on the center server 100 corresponding to the respective process servers 200 can control whether to send a job execution request to a corresponding process server 200 at timing it manages or to wait for polling access from the process server 200 before sending a job execution request, according to the access type of the process server 200, as described above. This means that the difference in the access types among the process servers 200 can be accommodated by the control by the PS agent sections 120. Therefore, a process server 200 capable of receiving a job execution request directly from the center server 100 can coexist with a process server 200 that is placed inside a firewall and performs polling before receiving a job execution request in the system according to the present embodiment.

As described above, the configuration according to the present embodiment can include a process server 200 that performs polling before receiving a job execution request. Even in this case, the scheduler section 110 can perform optimum scheduling based on the capacity of the process server 200 as well as the type and characteristics of a job regardless of the operating status of the process server 200 because the scheduler section 110 issues the job execution request to the process server 200 through the PS agent sections 120.

Furthermore, according to the present embodiment, the PS agent sections 120, each of which corresponds to one process server 200, are provided on the center server 100, and the PS agent sections 120 manage information about the corresponding process servers 200 and control transmission and reception of requests and responses as described above. Furthermore, the scheduler section 110 assigns a job to a process server 200 on the basis of the information about the process server 200 managed by a corresponding PS agent section 120. Therefore, when a process server 200 is to be added to or removed from the system, the system configuration can be readily changed by adding or removing a PS agent section 120 corresponding to the press server.

The invention claimed is:

1. A computer system for performing grid computing with a plurality of computers connected through a network, the computer system comprising:
    a center server for requesting the plurality of computers on the network to execute a job; and
    a process server, which is one of the plurality of computers, for executing the job in response to a request from the center server;
    wherein the center server comprises:
        a scheduler section which assigns the job to be executed to the process server and issues a job execution request; and
        an agent section which manages information about the process server, receives the job execution request issued by the scheduler section, and sends the job execution request to the process server to which the requested job has been assigned, in a manner selected to accommodate an access type of the process server;
    wherein the system comprises a plurality of process servers, and each of the plurality of process servers is provided with a separate agent section, and the plurality of process servers includes at least one server with a polling access type and at least one server with a push access type.

2. The computer system according to claim 1, wherein the agent section obtains information about the capacity and operating status of the process server corresponding to the agent section from the process server and manages the information, and the scheduler section assigns the job to the process server on the basis of the information managed by the agent section.

3. The computer system according to claim 1, wherein the scheduler section issues at least two job execution requests assigned to different process servers, and at least one agent section sends a first job execution request received from the scheduler section to the corresponding process server in response to polling access from the corresponding process server, and at least one second agent section sends a second job execution request received from the scheduler section to the corresponding process server in a push type scheduling scheme at timing managed by the second agent section.

4. The computer system according to claim 1, wherein at least some of the process servers are connected to the center server through a firewall; and the agent sections corresponding to said process servers send the request received from the scheduler section to the process servers connected through the fire wall in response to polling accesses from the process servers.

5. A server for scheduling jobs and requesting execution of the jobs in a grid computing system, the server comprising:

a processor; and a memory operably connected to the processor, and having encoded thereon instructions executable by the processor, comprising:

a scheduler section which assigns a job of the jobs to be executed to a computer constituting the grid computing system and request the computer to execute the job;

an agent section which manages information about the computer, receives the request for execution of the job by the scheduler section on behalf of the computer to which the job has been assigned, and provides a request for execution of the job to the computer to which the requested job has been assigned, in a manner selected to accommodate an access type of the computer;

wherein the computer comprises a plurality of process servers, and each of the plurality of process servers is provided with a separate agent section; and the plurality of process servers includes at least one server with a polling access type and at least one server with a push access type.

6. The server according to claim 5, wherein the agent section is provided for each of computers constituting the grid computing system and makes the request for execution of the job by using an individual communication scheme established between the agent section and a corresponding computer.

7. The server according to claim 6, wherein a separate agent section is provided for each of the computers, the scheduler section issues at least at least one job execution request to each of at least two different computers, and at least a first one of the agent sections provides a request for execution of the corresponding job to a first one of the computers constituting the system in response to polling accesses from the first one of the computers, and at least a second one of the agent sections provides a request for execution of the corresponding job to a second one of the computers in a push scheduling scheme at timing managed by the agent sections.

8. A server for scheduling jobs and requesting execution of the jobs in a grid computing system, the server comprising:

a processor; and a memory operably connected to the processor, and having encoded thereon instructions executable by the processor, comprising:

an agent section which manages information about capacity and operating status of a computer constituting the grid computing system, relays communication with the computer, and performs transmission and reception of a job request which has been assigned to the computer, according to an access type of the computer; and a scheduler section which assigns, on the basis of the information managed by the agent section, the job to be executed by the computer, and requests the computer to which the job has been assigned to execute the job through the agent section; and wherein the computer comprises a plurality of process servers, and each of the plurality of process servers is provided with a separate agent section;

the plurality of process servers includes at least one server with a polling access type and at least one server with a push access type.

9. The server according to claim 8, wherein separate agent sections are provided for each of computers constituting the grid computing system, and the scheduler section requests execution of the job through the agent section corresponding to the computer to which the job has been assigned.

10. The server according to claim 8, wherein the scheduler section assigns the job on the basis of information about the capacity of the computer stored in the agent section and makes the request for execution of the job regardless of an access type of the computer to which the job has been assigned, and the agent section sends a request for execution of the job issued by the scheduler section to at least a first one of the computers in response to polling accesses from the computers, and sends a request for execution of the job issued by the scheduler section to at least a second one of the other computers in a push scheduling scheme at timing managed by the agent section.

11. A job execution control method using a process server computer to schedule jobs and request execution of the jobs in a grid computing system, comprising the steps of:

the computer assigning a job on the basis of capacity of a process server constituting the grid computing system, stored in a storage, and executing a job of the jobs, regardless of the access type of the process server;

the computer issuing a job execution request to the process server to which the job has been assigned; and the computer holding temporarily the issued job execution request and an agent section of the computer sending the job execution request to the process server to which the job has been assigned, according to the access type of the process server;

wherein the process server comprises a plurality of process servers, and each of the plurality of process servers is provided with a separate agent section; and the plurality of process servers includes at least one server with a polling access type and at least one server with a push access type.

12. A computer program product, comprising a computer readable non-transitory storage medium having encoded thereon:

computer instructions for storing in recording means and managing information about a process server which constitutes a grid computing system and executes a job;

computer instructions for assigning the job to be executed to the process server on the basis of information about the process server and issuing a job execution request; and computer instructions for receiving the job execution request and sending a request to the process server to which the requested job has been assigned, in a manner selected to accommodate an access type of the process server;
wherein the the process server comprises a plurality of process servers, and each of the plurality of process servers is provided with separate computer instructions for receiving the job execution request and sending a request to the process server to which the requested job has been assigned in a manner selected to accommodate an access type of the process; and
the plurality of process servers includes at least one server with a polling access type and at least one server with a push access type.

13. The computer program product according to claim 12, wherein the computer instructions for sending a request to the process server send the request regardless of an operating status of the process server.

14. The computer program product according to claim 12, wherein the computer instructions for sending the request to the process server cause the computer to send the request to at least a first one of a plurality of process servers in response to polling accesses from the process servers, and send the request to at least a second one of a plurality of process servers at timing managed by the computer.

15. The computer program product according to claim 12, wherein the computer instructions for sending the request to the process server cause the computer to send the request received from a scheduler section to the process server connected to the computer through a firewall in response to a polling access from the process server.

* * * * *